United States Patent [19]

Herlik

[11] Patent Number: 5,549,259
[45] Date of Patent: Aug. 27, 1996

[54] INNOVATIVE AIRTANKERS AND INNOVATIVE METHODS FOR AERIAL FIRE FIGHTING

[76] Inventor: Edward C. Herlik, 9 S. Main St., Camden, Del. 19934

[21] Appl. No.: 197,849

[22] Filed: Feb. 17, 1994

[51] Int. Cl.⁶ .............................. A62C 3/02; A62C 35/58; B64D 1/16
[52] U.S. Cl. ...................... 244/136; 244/137.1; 244/121; 169/47; 169/62
[58] Field of Search ................................ 244/137.4, 136, 244/137.1, 53 B, 121; 169/34, 47, 62, 66, 67; 102/382, 384

[56] References Cited

U.S. PATENT DOCUMENTS

| | | | |
|---|---|---|---|
| 2,349,980 | 5/1944 | Moore | 102/382 |
| 2,408,774 | 10/1946 | Goddard et al. | 244/136 |
| 2,836,463 | 5/1958 | Wilson | 244/136 |
| 2,956,866 | 10/1960 | Dick | 244/136 |
| 3,547,000 | 12/1970 | Haberkorn | 244/136 |
| 3,871,844 | 3/1975 | Calvin, Sr. | 244/53 B |
| 4,290,364 | 9/1981 | Weidenhagen et al. | 102/384 |
| 4,494,438 | 1/1985 | Lighton et al. | 244/137.4 |
| 4,830,311 | 5/1989 | Pritchard et al. | 102/384 |
| 5,103,712 | 4/1992 | Minovitch | 244/137.1 |
| 5,138,947 | 8/1992 | Opitz et al. | 102/213 |
| 5,148,989 | 9/1992 | Skinner | 244/136 |
| 5,279,481 | 1/1994 | Trotter | 244/136 |
| 5,320,185 | 6/1994 | Foy et al. | 244/136 |
| 5,326,057 | 7/1994 | Pahl et al. | 244/136 |

FOREIGN PATENT DOCUMENTS

| | | | |
|---|---|---|---|
| 2610287 | 8/1988 | France | 244/136 |

*Primary Examiner*—Andres Kashnikow
*Assistant Examiner*—Virna Lissi Mojica

[57] ABSTRACT

This invention, and the associated methods, relate to fighting fires from aircraft. The invention, and the associated methods, also relate to early detection of fires; delivering liquids (primarily fire retardant or water) in a timely and accurate manner for the suppression of fires; and performing those functions under conditions of smoke obscuration and darkness which currently inhibit or prohibit aerial fire fighting. The novel capabilities detailed in this patent also allow for useful functions not now performed by airtankers such as, but not limited to, search and rescue; disaster damage assessment and recovery; law enforcement; natural resource protection such as dispersant spraying on oil spills, and avalanche control. Specifically, this invention concerns the conversion and operation of aircraft as airtankers equipped with baffled liquid storage tanks; high velocity-high volume liquid discharge systems using large bore discharge tubes fitted with impellers; inflight liquid refilling systems for taking on liquid from other aircraft in flight; inertial navigation systems; computer aided aiming systems; and infrared vision systems integrated with heads up displays.

9 Claims, 2 Drawing Sheets

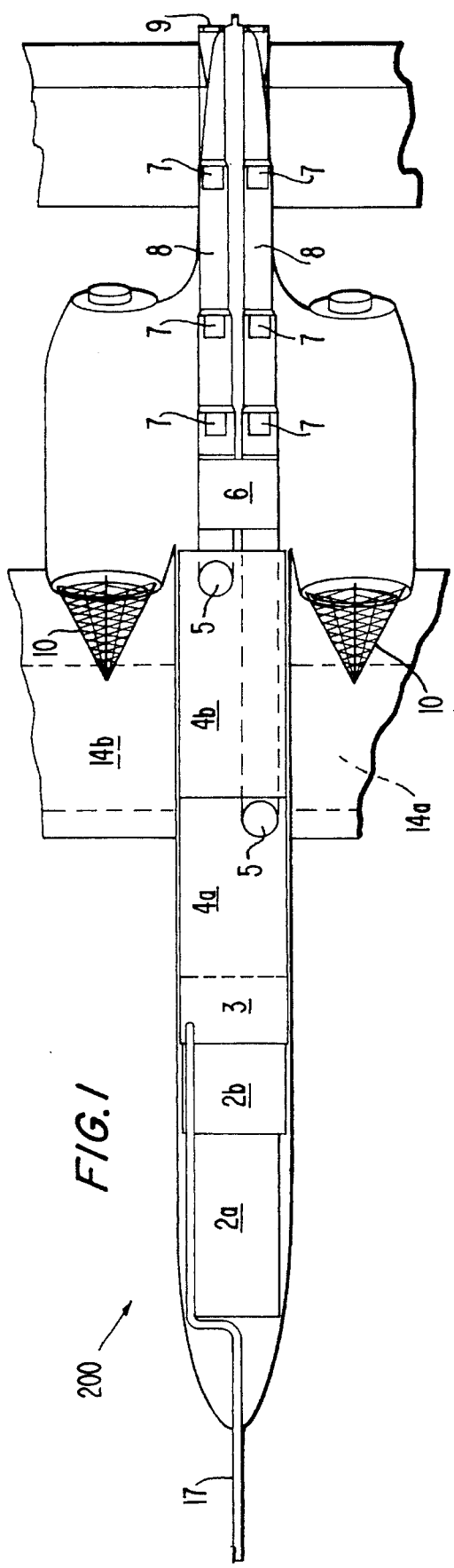
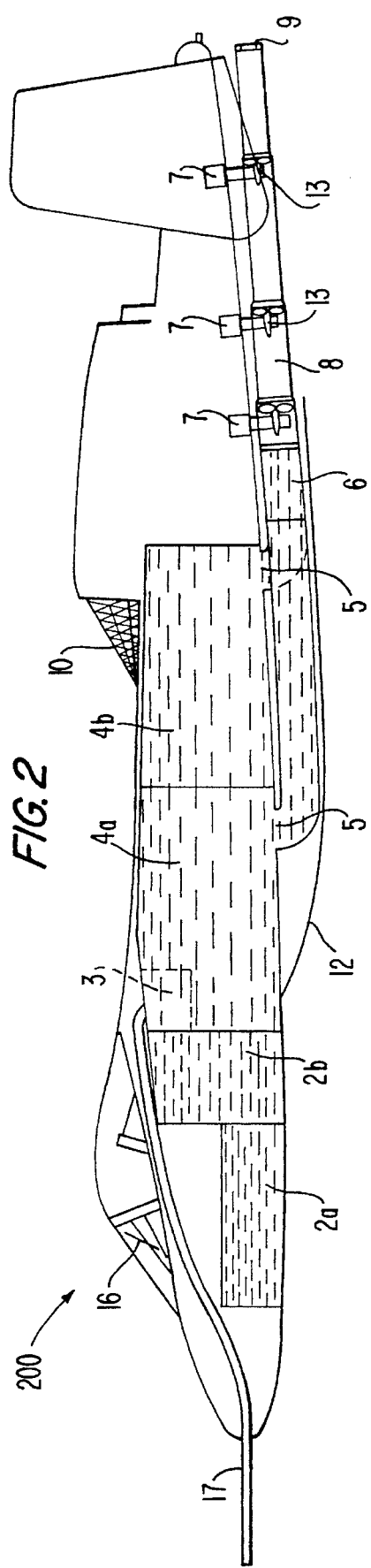

INNOVATIVE AIRTANKERS AND INNOVATIVE METHODS FOR AERIAL FIRE FIGHTING

RELATED ART

The best known prior art concerning airtankers includes
U.S. Pat. No. 5,135,055 Ground and Airborne, Fire Fighting System and Method of Fighting High Rise Building Fires;
U.S. Pat. No. 4,936,389 Fluid Dispenser for an Aircraft;
U.S. Pat. No. 4,930,826 Cargo Apparatus for Attaching a Cargo Container to an Aircraft;
U.S. Pat. No. 4,881,601 Apparatus for Deployment of Aerial-Drop Units;
U.S. Pat. No. 4,671,472 Fire Bombing and Fire Bombers;
U.S. Pat. No. 4,601,345 Mixing and Drop System for Fire Retardants;
U.S. Pat. No. 4,576,237 Fire Fighting Bucket Assembly for Aircraft;
U.S. Pat. No. 4,474,350 Probe for Water Bomber;
U.S. Pat. No. 4,376,466 Fire Extinguishing Apparatus for Air Dropping a Fire Extinguishing Agent;
U.S. Pat. No. 4,240,507 Fire Extinguishing System Having a Dosaging Cylinder for an Additive;
U.S. Pat. No. 4,195,693 Device for Extinguishing Fires from the Air;
U.S. Pat. No. 4,172,499 Powder and Water Mixing and Dropping System Onboard an Aircraft;
U.S. Pat. No. 3,901,467 Aircraft Fire Bombing System;
U.S. Pat. No. 3,754,601 Fire Bombing Method and Apparatus;
U.S. Pat. No. 3,698,480 Dual Air Borne Fire Retardant Dispersing System;
U.S. Pat. No. 3,661,211 Firefighting Apparatus;
U.S. Pat. No. 3,598,342 Release Device for Water Bombing from Aircraft;
U.S. Pat. No. 3,572,441 Liquid Discharge Tank Adapted to be Hung and Transported;
U.S. Pat. No. 3,519,080 Equipment for the Aerial Transport of Liquids, Particularly for Fighting Fires;
U.S. Pat. No. 3,494,423 Airborne Fire Suppression System;
U.S. Pat. No. 3,485,302 Apparatus for Firefighting and the Like;
U.S. Pat. No. 3,481,405 Fire Fighting Aircraft;
U.S. Pat. No. 3,442,334 Fire Fighting Apparatus.

SUMMARY OF THE INVENTION

An aircraft converted or built to these specifications will be able to precisely drop measured amounts of liquid using an infra-red vision system, computerized aiming references and high capacity impellers mounted in the discharge tubes. Said liquid will be discharged at substantial velocity relative to the aircraft, and opposite the direction of flight, in order to reduce the dispersion losses caused by dropping a liquid from an aircraft. Such aircraft are customarily used to fight fires. That aerial fire fighting art is improved with the capability to detect fires with infra-red sensors and then deliver fire retardant under conditions of smoke obscuration and darkness which currently inhibit or prohibit aerial fire fighting. This machine will also be capable of other functions such as search and rescue; disaster damage assessment and recovery; law enforcement; and natural resource protection such as dispersant spraying on oil spills and avalanche control.

DRAWINGS

Three figures are provided for illustration:

FIG. 1 is a top view of the fuselage section of the preferred embodiment converted aircraft, the Fairchild A-10, showing major sub-systems.

FIG. 2 is a left side view of a converted A-10.

DETAILED DESCRIPTION

Figure 3:
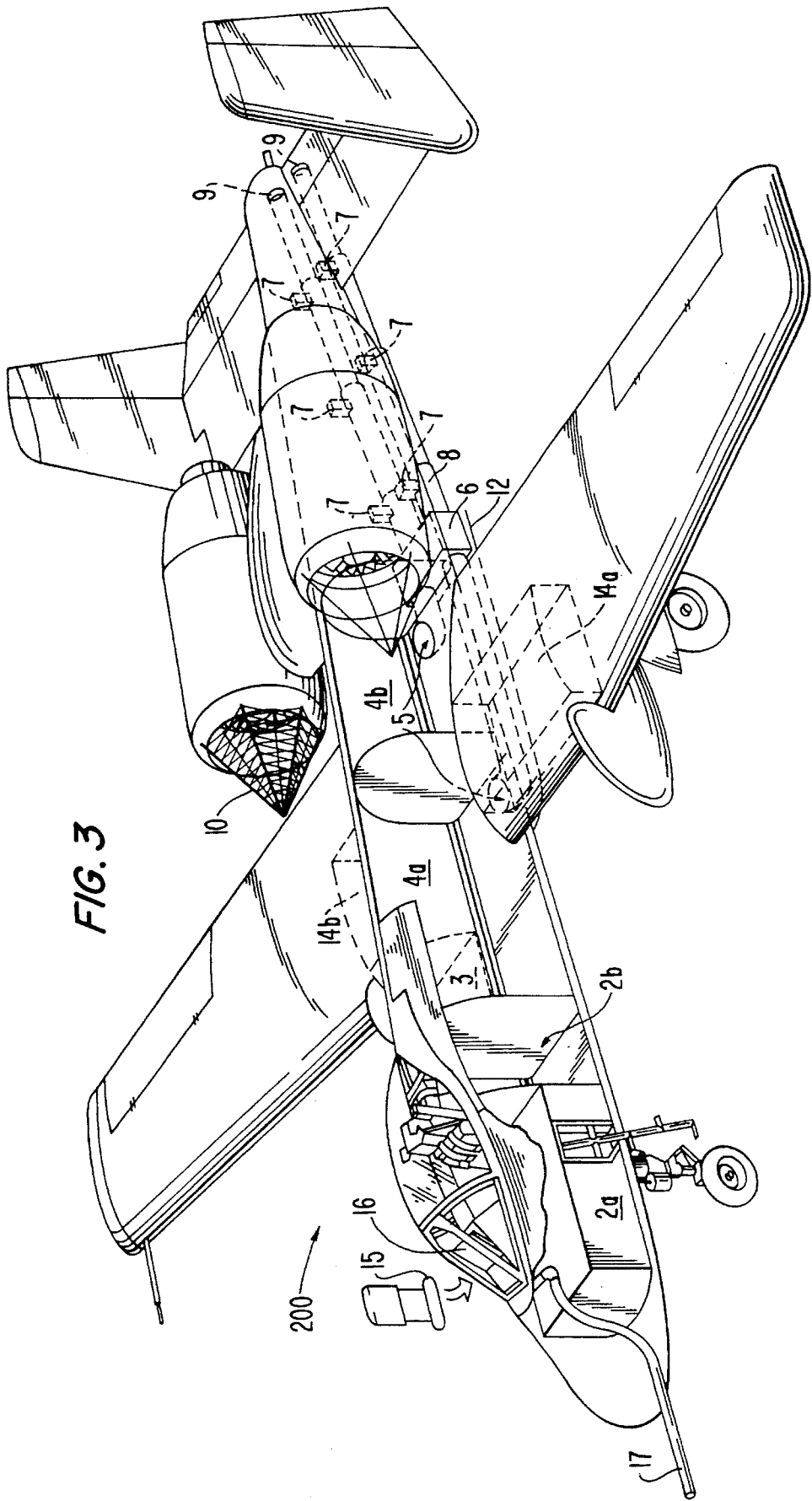
FIG. 3 is a perspective of the converted A-10 also showing the locations of the major sub-systems.

Airtanker operations for fire fighting is a well known art involving either retrofitting utility or transport aircraft with tanks that can release a liquid while in flight, or purpose building such aircraft. Most such aircraft are converted military machines which operate from conventional runways though some civilian models and amphibians are also used. Except for U.S. Pat. No. 3,442,334 "Fire Fighting Apparatus", each of the cited patents describes a gravity powered liquid discharge system while each is absolutely dependent on pilot judgment for drop accuracy.

Aerial fire fighting involves many of the same functions as military weapons delivery. Using fire fighting terms, this description first reviews the art and then details the related innovations as part of the invention's objectives.

LIQUID RELEASE: U.S. Pat. No. 3,442,334 "Fire Fighting Apparatus" uses pumps mounted in a helicopter borne retardant tank to discharge the liquid. In that system, the liquid is sprayed downward into the rotor down wash to disperse it quickly. Said '334 patent is, therefore, not relevant because my proposed apparatus accelerates liquid horizontally, essentially parallel to the flightpath, in order to prevent dispersion. Each of the other previous methods rely on gravity to move the liquid more or less vertically into the air through doors mounted on the bottoms of the storage tanks. Although such gravity dependent methods benefit from simplicity, they limit the effectiveness of aerial fire fighting operations.

Dropping a liquid which is at rest relative to the aircraft subjects it to the full force of the relative wind, which is equal to the aircraft's velocity through the air. In other words, liquid dropped from an aircraft which is moving through the air at 140 mph experiences forces equal to those found in a 140 mph wind. Those forces violently disperse and vaporize a significant portion of the dropped liquid, especially non-gelled liquid, thus reducing the effectiveness of the operation by reducing the proportion of the dropped liquid that reaches critical areas on the ground. Said dispersion is the cause of the rapidly blooming droplet cloud which is always seen when a fixed wing aircraft drops a liquid.

That dispersion problem is addressed in patent number U.S. Pat. No. 4,671,472 "Fire Bombing and Fire Bombers" but is not resolved by that method's attempt to accelerate the dropped liquid by gravity and to reduce dispersion through streamlining. That method relies on simple physics, which apply only during freefall in a vacuum, and so cannot work given the viscous nature of fire retardant, the friction inherent inside pipes and the velocity reduction which is unavoidable when a liquid is restricted (as happens when the falling liquid stream is shaped by the tubes). Even the 8.5 mph theoretical maximum freefall velocity attained in the stated ten foot drop is irrelevant because it ignores the fact that no object can freefall through air at faster than it's terminal velocity (less than 120 mph for water). The streamlining of the liquid stream claimed in said '472 patent will also not produce the claimed benefit of reducing stream erosion. Streamlining of such a large object (the liquid stream) cannot occur unless its internal cohesion is greater than the external forces. In other words, it must stay in one piece to be streamlined. Since tile only cohesion in even gelled retardant is surface tension plus the gelling action, the liquid stream will vaporize or form drops when torn apart by the 140 mph+ relative wind experienced at release.

LIQUID PATTERN CONTROL,: Controlling the shape and density of the liquid pattern delivered to the ground is difficult and imprecise under the present art for fixed winged aircraft. Even those drop doors fitted with restriction devices and controlled by intervalometers can only vary the duration and timing of the liquid pulses which are released. While opening such doors on the bottom of a tank may be the best method for emptying said tank quickly, no variation on that method has proven flexible or effective at delivering a pattern other than an oval, or a string of ovals, with significantly greater density at the center than at the edges.

AIMING: All of the airtankers in use today rely on unaided visual aiming and pilot skill for the accuracy of their deliveries. Wind velocity and direction must usually be judged without mechanical measurement, the aircraft's flight path is not displayed to the pilot in any way and factors which obscure vision (such as smoke or darkness) hinder or prohibit liquid delivery. Nothing in the art addresses these problems.

NAVIGATION: Most of today's airtankers rely on external radio navigation aids to reach a fire scene when conditions do not permit visual navigation. Many fire prone and remote areas are out of range of such navigation aids. Such navigation is also not precise enough to safely approach a fire under the severely restricted visibility commonly experienced by airtankers at work. Visual navigation is imprecise in limited visibility and highly dependent on pilot skill plus familiarity with the terrain.

RESPONSE TIME: Today's airtankers are very slow with cruising speeds generally ranging from 180 to 280 mph through the air. Such low speeds lengthen the response time required to reach a fire and add to the time required to return to a tanker base to refill the liquid tanks. None of today's airtankers can be refilled inflight though some amphibians can take on water during a high speed taxi if a suitably long stretch of water is available. U.S. Pat. No. 3,754,601 "Fire Bombing Method and Apparatus" incorporates a retardant concentrate storage tank but still requires that long stretch of open water for amphibious operations.

FIRE DETECTION AND LOCATION: In today's art, fires must be detected visually, reported and then attacked by airtankers. Detection must usually wait for smoke and flame to build to a point where it can be seen from a distance. Such delays, added to the response time of the fire fighting system, allow relatively small fires to build beyond the point where they can be easily suppressed. The October 1993 fires near Los Angeles, for example, were commonly reported when less than one acre in size but exploded to between 100 and 300 acres by the time airtankers arrived.

LIMITED USE AIRCRAFT: With the exception of transports fitted with removable liquid tanks as detailed in U.S. Pat. No. 3,698,480 "Dual Air Borne Fire Retardant Dispersing System", today's airtankers are single use aircraft. When not fighting fires, their extensive modifications prevent their practical use for other functions so they remain idle for long periods, especially during the winter. Aircraft using said '480 art may be used for cargo transportation when the liquid tanks are removed.

INFLIGHT HAZARDS: Airtankers face inflight hazards that are intensified by the wild fire environment. Such hazards include collisions with heavy birds that are attracted by wild fires and which soar in the thermal updrafts.

PERFORMANCE LIMITATIONS: Today's airtankers are largely based on old aircraft which are slow and which operate without normal safety margins when

OBJECTS OF THE INVENTION

This innovative airtanker, and the associated innovative aerial fire fighting methods, correct the above problems and improve the art through these objectives:

It is an object of this invention to provide an airtanker aircraft for the suppression of fires from the air which incorporates modern technology not now known in the art. This objective is met by converting military attack/fighter type aircraft, and their weapons delivery systems, to airtanker operations.

LIQUID RELEASE: It is a further object of this invention to provide an airtanker liquid discharge system which accelerates the dropped liquid to substantial velocity and ejects it rearward from the aircraft and essentially parallel to the flightpath. The resulting velocity of the liquid subtracts directly from the velocity of the aircraft thereby greatly reducing the forces which disperse and vaporize said liquid. For example, if an airtanker using this new technology passes through the air at 140 mph while discharging its liquid in the direction opposite to its direction of flight (rearward) at 60 mph, the ejected liquid will only experience the forces of the liquid's resultant 80 mph velocity. This method reduces the liquid's velocity relative to the air to below its terminal velocity of about 120 mph and well below the aircraft's velocity. Rather than experiencing the full force of said 140 mph relative wind, which is unavoidable in the known art, liquid discharged by this apparatus will only experience the significantly lesser forces of its lower resultant velocity. Said liquid then forms drops naturally without being vaporized by higher velocity relative wind which is always above water's terminal velocity in the current art.

It is another object of this invention to affect said velocity change by accelerating said liquid through discharge pipes fitted with pumps or impellers.

LIQUID PATTERN CONTROL: Another object of this invention is to vary the dropped liquid's pattern and density on the ground by varying the number of discharge pipes used simultaneously, by varying the velocity of the liquid in each pipe and by varying the duration of their liquid discharge. That flexibility allows for variations in dropped liquid patterns and density that is not remotely possible with the present art.

It is a further object of this invention to provide airtankers which may be safely flown in formation under conditions which currently prohibit formation flight. Such formations of airtankers allow further variations on liquid drop patterns which are beyond the capabilities of any single aircraft.

AIMING: Another object of this invention is to overcome the visual aiming limitations by use of infra-red vision systems which allow the pilot to attack fires which would otherwise be obscured by darkness, smoke and/or haze.

A further object of this invention is to incorporate military weapons delivery technology into airtankers. That new fire suppression art will have computers calculating exact aiming cues or references based on all relevant forces affecting the liquid delivery and displaying said aiming reference on heads up displays.

NAVIGATION: Another object of this invention is to overcome navigation problems by adding inertial navigation systems, and possibly satellite navigation systems, to the visual and radio navigation technology currently in use. Either inertial or satellite navigation is available at any point on Earth and so is not affected by the gaps in radio navigation coverage. Such systems will also allow safe navigation in heavily obscured conditions when said navigation information is presented on the heads up display and verified with the infra-red vision system.

RESPONSE TIME: The preferred embodiment for the subject innovative airtanker is a military attack/fighter type aircraft, here represented by the Fairchild A-10 Thunderbolt 11. It is, therefore, another object of this invention to reduce airtanker response time by increasing the speed of said aircraft. The A-10's 360 mph cruising speed through the air is 100 mph faster than the fastest common airtanker now in use. Given a nominal 150 mile round trip to a tanker base for liquid refill, the speed difference gives the A-10 a response time advantage of 11 to 25 minutes per trip. Given the airspeeds common to today's airtankers plus 15 minutes to deliver the liquid on the fire and another 15 minutes to refill at the tanker air base, the present art allows one delivery every 66 to 80 minutes. The A-10 airtanker can perform the same functions in 55 minutes. Other suitable attack/fighter aircraft, such as the Grumman A-6 Intruder, are significantly faster still.

It is a further object of this invention to reduce response time by providing an airtanker which can refill its liquid tanks inflight using well known refueling hardware and techniques. Said techniques involve the receiver flying in formation behind the tanker while liquid passes through a hose trailed by the tanker and which is connected to a probe extending from the receiver. The preferred airtanker can fly from the tanker base to a fire, drop its original liquid load, refill from an orbiting aircraft and drop a second time in 15 minutes, refill inflight and drop a third time in another 15 minutes, and then return to the tanker base for fuel and liquid in a total of 85 minutes. In other words, the preferred innovative new airtanker can deliver approximately 4500 gallons of liquid and be reloaded for takeoff from base in approximately the time it currently takes a common heavy airtanker to deliver 2500 gallons of liquid and reload. In either scenario, the drastic reduction in response time is a significant improvement in the art. Given the stated new technology, it is another object of this invention to further reducing response time by provide airtankers which can patrol over areas that are especially prone to burn (such as Southern California when arsonists take advantage of the Santa Ana winds) while searching through darkness and haze in the infra-red spectrum. Having detected an as yet extremely small fire, said innovative new airtankers can then suppress it with little additional effort. These new airtankers can deal with fires at the one acre stage thereby obviating the need to confront so many 100 to 300 acre and expanding fires.

FIRE DETECTION AND LOCATION: A further object of this invention is to fit this innovative new airtanker with an infra-red vision system. Said system detects a fire's infra-red radiation long before smoke is visible and is not hindered by darkness, smoke, haze or dust obscurations. Flight safety is maintained by displaying the infra-red information on a wide field of view heads up display. Such displays and aerial deliveries in obscured conditions, as well as at night, are standard art in the military but have never been applied to airtanker operations.

LIMITED USE AIRCRAFT: Given the new capabilities of this innovative airtanker, it is another object of this invention to provide airtanker aircraft which are useful year round. Given the infra-red systems and flexible liquid delivery systems, these innovative new airtankers are also useful for search and rescue (by scanning for infra-red as well as visual radiation); disaster damage assessment and recovery (by recording disaster scenes in both infra-red and visual light, and by acting as a communications relay); law enforcement (by infra-red scanning day or night); and natural resource protection such as dispersant spraying on oil spills and avalanche control.

INFLIGHT HAZARDS: Airtankers face inflight hazards that are intensified by the wild fire environment, specifically collisions with large birds. It is, therefore, a further object of this invention to counter the bird strike hazard with deflectors over the engine intakes. Such deflectors reduce engine damage caused by ingesting birds by deflecting all or most of those birds away from the engine intakes.

PERFORMANCE LIMITATIONS: It is another object of this invention to reduce the safety threat inherent in operating without normal performance margins at takeoff with the choice of higher performance, military attack/fighter type aircraft such as the A-10.

INNOVATIVE AIRTANKER METHODS

The new and unique capabilities of this innovative airtanker allow for previously impossible fire fighting methods.

COMPUTER AIDED DELIVERY: Given the weapons aiming computers retained on the converted attack/fighter type airtanker, or fitted to other airframes, the new liquid delivery method of aiming with computer generated cues projected on a heads up display is proposed. Said weapons aiming computers are programmed with the freefall characteristics of the material to be dropped. They then measure the relevant parameters of the aircraft's performance and its environment to calculate the precise point on the ground where the material will impact. That calculated information is then projected on the aircraft's heads up display in the form of an aiming symbol. The pilot, looking through the heads up display at the terrain in front of him or her, then maneuvers the aircraft to line said aiming symbol up on the desired impact area and releases the liquid when the aiming symbol is superimposed on that desired impact area. The result is airtanker liquid delivery with the accuracy seen by the public for the first time during Desert Storm.

RESTRICTED VISIBILITY DELIVERY: Given the infra-red sensor system on this innovative new airtanker, flight and liquid delivery is now practical and safe under restricted visibility conditions such as darkness, smoke and haze which previously prohibited airtanker operations. If the infra-red sensor is gimbaled, the airtanker pilot can also scan the fire scene from high overhead before approaching for his or her delivery. Since said infra-red system is unaffected by darkness, smoke, haze etc., singularly or in any combination, liquid deliveries made with said infra-red systems are safe and as accurate as deliveries made in clear daylight. Significant improvements in the art arise from the ability to fight fires, and to navigate visually in the drop area, under darkness and/or totally obscured conditions.

REDUCED RESPONSE TIME: Given the capability to refill liquid tanks in flight, this innovative new airtanker allows the new fire fighting method of transferring liquid to airtankers in flight thereby reducing the number of round trips to an air base. Said method greatly increases the amount of liquid that can be delivered in any given time period which correspondingly reduces the time and resources required to suppress a fire. Even if operated conventionally from airtanker bases, these new airtankers significantly reduce response times by virtue of their greater speed.

PREVENTIVE AIRTANKER PATROL: Said innovative airtanker has the previously impossible capability to patrol over threatened areas while scanning the infra-red spectrum, through darkness and obscuration, for small fires. When such a new fire is detected, the pilot can suppress it immediately with the other innovative new systems previously detailed. This new method is impossible in today's art as airtankers must almost always be led to fires by specialized lead planes and none of them, airtankers or lead planes, operate at night.

FORMATION FLIGHT: Innovative new airtankers with properly trained pilots are able to attack fires while flying in formation. Said new airtankers, flying in formation, can spread out, overlap or sequence liquid drop patterns in ways that are not now possible. Formation drops also facilitate a higher concentration of aircraft in the same airspace thereby reducing the time required to suppress a fire and increasing safety (by reducing the number of independent entities in the air near a fire). Formation flight is practical either visually or with the aid of the infra-red systems.

This invention, and the associated methods, have been described with reference to the A-10 aircraft for illustrative purposes. It is apparent to those skilled at the art of fighting fires from the air that different airframes may be used and that changes and modifications to these specifications may be made without departing from the spirit and scope of this invention or the associated methods as claimed here. These systems may also be fitted to current airtankers and other non-attack/fighter type airframes to realize many of the same benefits.

DESCRIPTION OF THE PREFERRED EMBODIMENT

Developing an innovative new airtanker begins by selecting a suitable and available airframes for conversion or developing a purpose built model. For this description, the Fairchild A-10 Thunderbolt II will be used as the example airframe for conversion. The technologies described here can easily be designed into other converted or purpose built airtankers by someone skilled in the art.

The A-10 (200) is first demilitarized by removing the gun, those weapons pylons which are not needed for external fuel tanks and the militarily sensitive hardware. The two fuselage fuel tanks and their associated plumbing are also removed but the inflight refueling hardware is retained. Other extraneous hardware and fittings are removed to reduce the aircraft's weight as much as is practical. The two wing fuel tanks 14a, 14b may also be removed and replaced with the highest capacity conventional fuel cells that will fit in the given space and which are then connected to the remaining plumbing. One or two new fuel cells 2a, 2b are fitted in the nose approximately in the space vacated by the gun and plumbed so that fuel feeds out of the forward most tank last in order to keep weight in the aircraft's nose as long as possible. The new fuel tanks are plumbed so that fuel from the single point refueling receptacle passes through the left wing, nose, and right wing tanks enroute to the external fuel tanks in order to eliminate fuel stagnation in the nose tanks. Existing external fuel tank plumbing is connected to the new fuel tanks. Appropriate connections are made to the engines and the auxiliary power unit.

The fuselage space between the cockpit and the nose fuel tanks forward, and the auxiliary power unit and the internal structure of the tail aft, is filled with one or more baffled liquid tanks 4 designed to make maximum use of the available volume. A refilling fitting is mounted on the aircraft's right side (opposite the single point refueling receptacle on the left side) to allow all tanks to be filled from the standard airtanker retardant refill fitting.

If the aircraft is to be refillable in flight, a refilling probe 17 is mounted in the nose and plumbed to the liquid tanks 4. A storage tank 3 is fitted within the liquid tanks in such a manner as to hold concentrated retardant when its valves are closed and to be available for liquid storage when its valves are open. A system selectable by the pilot will flush said retardant storage tank so as to mix the concentrated retardant with water coming into the aircraft during in flight refilling. It is also possible to refill with pre-mixed retardant in the same manner.

High capacity plumbing is fitted to the aft-most low point of each tank and passed through the bottom of the fuselage taking care to not interfere with the use of external fuel tanks. If more than one of those tank drains 5 is required, they all then feed aft into a common manifold 6. One or more large diameter pipes 8 extend either from a single tank drain or the common manifold aft to near the trailing edge of the horizontal stabilizer. The discharge pipes may be stepped down in size to increase discharge velocity. The tank drain(s), the manifold if used and at least the joints with the discharge pipes are covered with an easily removed hiring 12 for streamlining. The inside of each pipe is polished, and possibly supplied with a non-stick coating, to reduce friction as much as practical. Each said discharge pipe is fitted internally with one or more high capacity impellers 13 which, in turn, are driven by motors 7 mounted within the aft fuselage and connected through shafts (transmissions) extending downward through the fuselage and pipe walls. The motors may be hydraulically driven by the aircraft's existing hydraulic systems (both engines and the auxiliary power unit) though other suitable power sources may be used. The discharge pipes 8 may be angled some few degrees from the aircraft centerline to compensate for the angle of attack at operating airspeeds and other aerodynamic factors. The aft ends of the pipes are supplied with variable nozzles or quick release fittings 9 that allow various fixed nozzles to be installed.

The aircraft is also fitted with an infra-red vision system 15. That sensor may or may not be gimbaled. If it is gimbaled, then the aircraft will also be fitted with a video monitor in the cockpit. In any case, the infra-red view will be displayable, at the pilot's discretion, on a wide field of view heads up display 16 which replaces the heads up display originally fitted to the A-10. All standard heads up display presentations are retained.

The innovative new airtanker is then stripped of paint, etc. The skin is smoothed and then finished in a high visibility paint scheme with materials chosen to reduce drag as much as is practical.

Since bird strikes are a serious threat, the engine intakes are fitted with a system designed to deflect large birds away from the engines. That deflector 10 may be six or eight solid supports spaced equally around the rim of the intake which join several feet in front of the intake and approximately on the engine's centerline axis. A continuous, extremely high strength fiber or filament is wound through the supports so as to form a mesh. The intent is for the mesh to transfer impact forces as widely as possible across the supports thereby deflecting a substantial portion of the bird away from the engine intake. The aircraft may also be fitted with ram air driven horns or whistles which alert or irritate the most commonly encountered birds when the aircraft is flown at liquid drop airspeeds. The aircraft may also be fitted with high intensity strobe lights oriented forward and intended to frighten or startle birds.

The described airtanker will be used to fight fires in this way: The airtanker will either fly to a known fire or locate the fire independently. On approach to the fire scene, the pilot will scan the area in infra-red to locate the fires and hazards while coordinating with the controlling person or agency. Having been assigned a drop point and liquid pattern, the pilot will then select the combination of discharge tubes and impellers required to meet the assignment while maneuvering to begin the drop run. Viewing the scene in infra-red displayed on the heads up display, the pilot will approach the fire and superimpose the aiming cue on the assigned drop area. When that aiming cue reaches the near end of the drop area, the pilot will begin releasing retardant. When the aiming cue reaches the far side of the drop area, the pilot will cease releasing retardant. He or she will then repeat the drops until the liquid tanks are empty and then refill those tanks from an orbiting aircraft or at the tanker base.

I claim:

1. A turbine engine powered firefighting airtanker comprising:

a vision enhancing system;

a helmet mounted display system to display the images generated by the vision enhancing system;

an aided aiming system;

a head up display system;

a retardant discharge system having a means to accelerate liquids;

a retardant discharge control system to control the acceleration and release of said liquids;

an aerial liquid reloading system having a means for transferring liquids inflight from a transport aircraft to said airtanker; and a low altitude ground proximity warning system having a means to warn the pilot of imminent ground impact.

2. A firefighting aircraft as set forth in claim 1 further comprising a means to generate constantly computed impact point cues for presentation on the head up display system.

3. A firefighting aircraft as set forth in claim 1 wherein said head up display system presents flight parameters and aiming cues to the pilot.

4. A firefighting aircraft as set forth in claim 1 further comprising deflectors over the turbine engine inlets.

5. A firefighting aircraft as set forth in claim 1 further comprising a retardant discharge system that accelerates and propels liquid substantially horizontally rearward from a tube or tubes.

6. A method for fighting fire from the air comprising the steps of:

converting a military fighter or attack aircraft to an airtanker by integrating: a sensor system designed to enhance the pilot's vision, a helmet mounted display to present said sensor's images to the pilot, a liquid discharge system designed to mechanically accelerate said liquid, a set of mechanical and electronic controls, computers and software to modulate said accelerated liquid, and an aerial liquid transfer system incorporating a means to accept liquid from another aircraft during flight;

aerial patrolling with said airtanker while scanning for fire both visually and with the vision enhancing sensor;

maneuvering said airtanker to drop said liquid by analyzing the fire with the vision enhancing sensor and with reference to the computer aided aiming systems;

setting the required liquid discharge parameters on the discharge controls;

accelerating the liquid substantially rearward and parallel to the airtanker's flight path at the point commanded by the computer aided aiming systems;

rendezvousing with a transport aircraft to receive a reload of liquid inflight; and returning to aerial patrol or to the fire scene.

7. A method of aerial firefighting as in claim 6 which incorporates a vision enhancing system designed to allow visual flight under conditions of reduced visibility.

8. A method of aerial firefighting as in claim 6 which incorporates an aided aiming system using computers to calculate a constantly computed impact point.

9. A firefighting aircraft as set forth in claim 1 which further comprises systems, fixedly or detachably mounted, for the autonomous relay of radio transmissions between ground or airborne stations.

* * * * *